(12) United States Patent
Wang et al.

(10) Patent No.: US 7,530,348 B2
(45) Date of Patent: May 12, 2009

(54) FUEL TANK HAVING FUNCTIONS OF ADJUSTING PRESS PRODUCED BY FUEL VOLATILIZING AND PREVENTING FUEL OVERFLOWING

(75) Inventors: Aaron Wang, Taoyuan (TW); Chun-Chao Huang, Taoyuan (TW)

(73) Assignee: Sentec E & E Co., Ltd., Taoyuan (TW)

( * ) Notice: Subject to any disclaimer, the term of this patent is extended or adjusted under 35 U.S.C. 154(b) by 246 days.

(21) Appl. No.: 11/745,142

(22) Filed: May 7, 2007

(65) Prior Publication Data

US 2008/0251139 A1    Oct. 16, 2008

(30) Foreign Application Priority Data

Apr. 10, 2007    (TW) .............................. 96112410 A (51) Int. Cl.
  *F02M 33/02*    (2006.01)
  *F02M 33/04*    (2006.01)
(52) U.S. Cl. ....................................... 123/518; 123/519
(58) Field of Classification Search ................. 123/516, 123/518, 519, 520, 198 D; 137/587, 588, 137/589, 43, 493; 60/283, 285
See application file for complete search history.

(56) References Cited

U.S. PATENT DOCUMENTS

| | | | | |
|---|---|---|---|---|
| 4,852,761 A * | 8/1989 | Turner et al. | ................. | 220/746 |
| 5,065,782 A * | 11/1991 | Szlaga | ......................... | 137/39 |
| 5,277,168 A * | 1/1994 | Kondo et al. | ................. | 123/519 |
| 5,944,044 A * | 8/1999 | King et al. | ................... | 137/202 |
| 6,343,590 B1 * | 2/2002 | Nagai et al. | ................. | 123/518 |
| 7,225,798 B2 * | 6/2007 | Wang et al. | ................. | 123/518 |
| 2006/0254641 A1 | 11/2006 | Callahan et al. | | |

* cited by examiner

*Primary Examiner*—Mahmoud Gimie (57) ABSTRACT

A fuel tank includes a canister and a fuel control valve arranged in an expanding room. The canister has two guiding pipes communicated respectively with an entrance of an engine and environment. The fuel control valve is communicated with the expanding room. A double-lane valve is arranged between the canister and the fuel control valve. The double-lane valve has an entrance communicated with the fuel control valve, an exit communicated with the canister, a first valve and a second valve arranged between the entrance and the exit. The second valve withstands a spring and is arranged on the first valve. The first valve can detect an expending press produced by volatilized fuel gas to control whether the fuel gas enter into the entrance of the engine. The second valve can detects a vacuum press of the fuel tank to control whether air enter into the fuel tank.

5 Claims, 8 Drawing Sheets

FUEL TANK HAVING FUNCTIONS OF ADJUSTING PRESS PRODUCED BY FUEL VOLATILIZING AND PREVENTING FUEL OVERFLOWING

FIELD OF THE INVENTION

The present invention relates to fuel tanks, and more particularly to a fuel tank mounted in a vehicle, which can adjust press produced by the fuel gas volatilizing and prevent the fuel overflowing.

DESCRIPTION OF THE RELATED ART

Recently, for avoiding volatilized fuel gas in a fuel tank overflowing, a canister is mounted at a route of the fuel tank communicating with the environment. The canister has a plurality of sieves and activated carbon arranged therein to filter deleterious matters of the fuel gas so as not to pollute the environment.

The conventional fuel tank supplies the fuel to an engine, and the volatilized fuel gas in the fuel tank is guided into an entrance of the engine through a recycle pipe, and is reused by intermittent negative press produced in operation of the engine.

However, the fuel in the route communicating with the environment and the recycle pipe of the conventional fuel tank is prone to overflow when the vehicle inclines. To solve the above problem, a conventional fuel tank has a fuel control valve arranged thereon for preventing the fuel overflowing when the vehicle inclines.

A conventional fuel tank disclosed in US Patent Publication No 2006/0254641 discloses a combining technology of fuel gas treating and the fuel control valve. The conventional fuel tank includes a canister and a fuel control valve arranged between the canister and an overflowing room, which is arranged at the fuel tank. A connecting pipe communicating with the environment and a recycle pipe are communicated with the canister. The volatilized fuel gas of the overflowing room can be filtered by passing through the canister and the fuel tank to exhaust out for reducing the expanding press of the fuel tank and recycling the fuel gas in the fuel tank. Furthermore, when the vehicle inclines, the fuel control valve is closed for preventing the fuel gas overflowing. However, since the route of the fuel gas volatilizing and the route communicated with the environment all pass through the fuel control valve, when the vehicle inclines, the fuel control valve is closed and the route of the fuel gas volatilizing and the route communicated with the environment are blocked such that the inner press of the fuel tank can not be adjusted. Furthermore, there is not a predetermined press control in the route of the fuel gas volatilizing so as to increase the burthen of the canister and increase the probability of polluting the environment.

What is needed, therefore, is a fuel tank which can adjust press produced by the fuel gas volatilizing and prevent the fuel overflowing.

BRIEF SUMMARY

An objection of the present invention is providing a fuel tank, which can adjust press produced by the fuel gas volatilizing and preventing the fuel overflowing, especially, providing a fuel tank having a double-lane valve which can respectively control two routes. The double-lane valve can cooperate with a fuel control valve and activated carbon arranged in the fuel tank for improving the capacities of filtering the fuel gas and preventing the overflowing fuel overflowing.

A fuel tank in accordance with a preferred embodiment, includes an expanding room by using a clapboard arranged in the top of the fuel tank to space out fuel gas from fuel, a canister arranged in the expanding room and having two guiding pipes communicated respectively with an entrance of an engine and the environment, a fuel control valve arranged in the expanding room and adjacent to the canister, and a double-lane valve arranged between the canister and the fuel control valve. The fuel control valve is communicated with the expanding room. The double-lane valve has an entrance communicated with the fuel control valve, an exit communicated with the canister, a first valve and a second valve arranged between the entrance and the exit. The second valve withstands a spring and is arranged on the first valve.

The present fuel tank has the double-lane valve arranged between the fuel control valve and the canister, therefore when the vehicle inclines and the fuel control valve is closed, the double-lane valve can control whether the volatilizing route of fuel gas passed through the canister and the recycling route of fuel gas are open respectively. Thus, the fuel tank has a capacity of adjusting the press therein even if the vehicle inclines.

The first valve and the second valve are used respectively to control the route of the fuel gas recycled to the entrance of the engine and the route of the fuel gas recycled to the fuel tank. Especially, the first valve is used to detect an expanding press produced by volatilized fuel gas larger than a press produced by the spring, the first valve opens to recycle the volatized fuel gas of the expanding room into the entrance of the engine through the fuel control valve, and when the expanding press is less than the press produced by the spring, the first valve closes to prevent the fuel gas recycling. The second valve is used to detect a vacuum press of the fuel tank larger than the air press, the second valve opens to compensate air into the fuel tank through the canister, and when the second valve detects the vacuum press of the fuel tank less than the air press, the second valve closes to prevent the air entering into the fuel tank. Therefore, the press of the fuel tank can be fully controlled, and the burthen of the canister for filtering the fuel gas can be decreased.

Other objects, advantages and novel features of the invention will become more apparent from the following detailed description when taken in conjunction with the accompanying drawings, in which:

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe a preferred embodiment of the present fuel tank, in detail.

Figure 1:
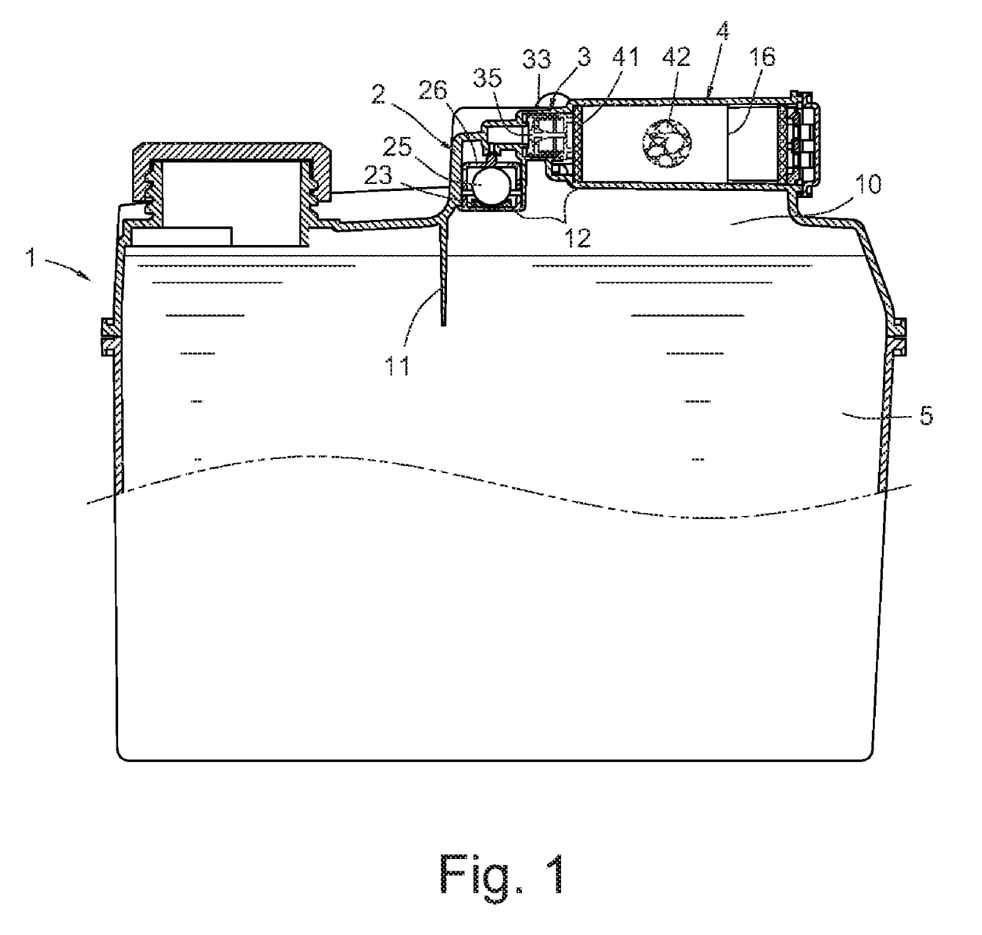
FIG. 1 is a schematic, cross-sectional view of a fuel tank in accordance with a preferred embodiment of the present invention.

Referring to FIG. 1, a fuel tank in accordance with a preferred embodiment of the present invention is shown. The fuel tank includes a fuel tank 1, a canister 4, a fuel control valve 2 and a double-lane valve.

Figure 2:
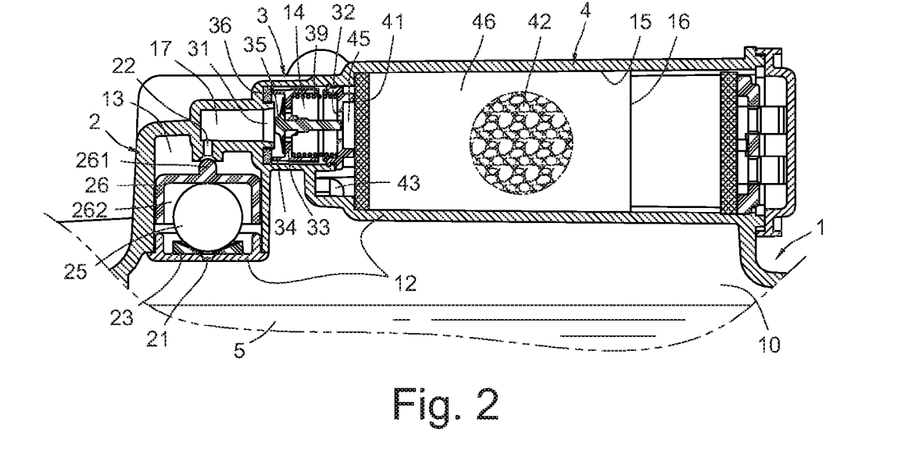
FIG. 2 is a schematic, part-larger view of FIG. 1.
Figure 3:
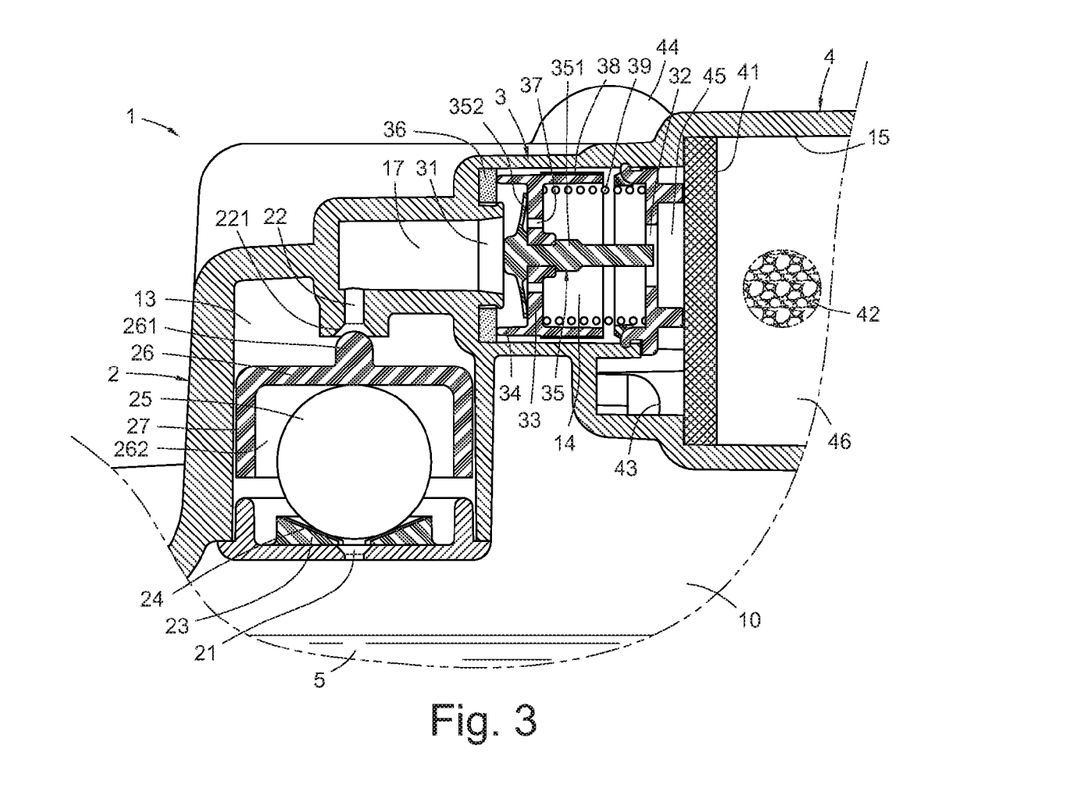
FIG. 3 is a schematic, part-larger view of FIG. 2.

The fuel tank 1 includes an expending room 10 by using a clapboard 11 arranged in the top thereof to space fuel gas from fuel, a first valve room 13, a second valve room 14 and a chamber 15 (as shown in FIG. 3) by using a plurality of clapboard 12 (as shown in FIG. 2) arranged in the expending room 10.

Figure 4:
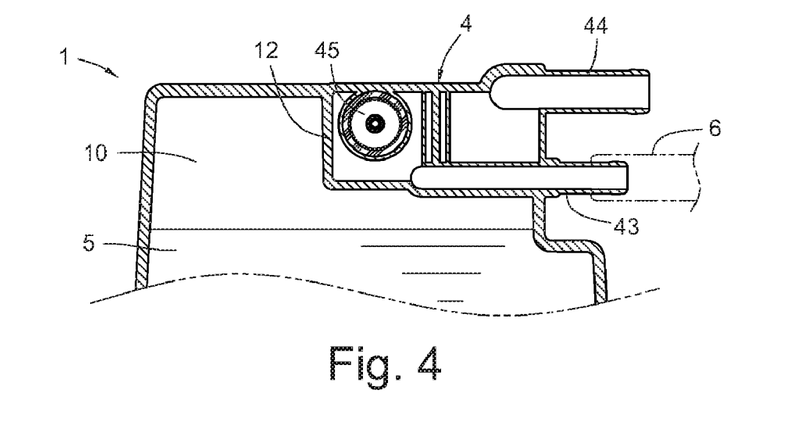
FIG. 4 is a schematic, side view of FIG. 2.
Figure 5:
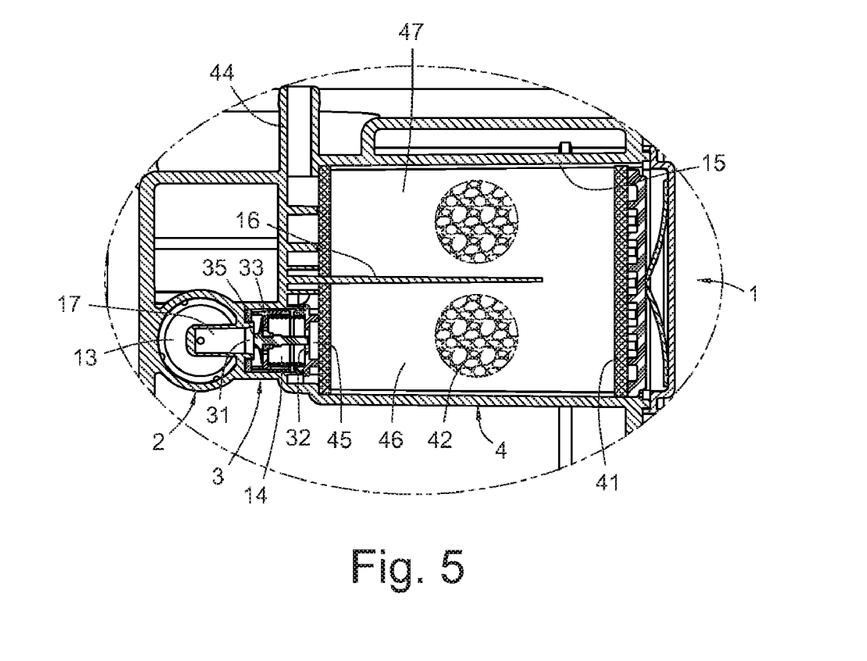
FIG. 5 is a schematic, top view of FIG. 2.

The canister 4 is arranged in the chamber 15 of the expending room 10 (as shown in FIGS. 1 and 2). The canister 4 includes a plurality of sieves and activated carbon arranged therein. A fuel gas entrance 45 is formed between the chamber 15 and the second valve room 14 for guiding the fuel gas to enter. A first guiding pipe 43 (as shown in FIGS. 3 and 4) is arranged in the canister 4 and communicated with a connecting pipe 6 of an entrance of an engine. A second guiding pipe 44 is also arranged in the canister 4 for being communicated with the environment. A clapboard 16 (as shown in FIG. 5) is arranged in the chamber 15 for forming a first filtering room 46 and a second filtering room 47 communicated with the first filtering room 46. The first filtering room 46 is communicated with the fuel gas entrance 45 and the first guiding pipe 43, and the second filtering room 47 is communicated with the second guiding pipe 44.

The fuel control valve 2 is arranged in the first valve room 13 of the expending room 10 and is adjacent to the canister 4 (as shown in FIGS. 1-3). The fuel control valve 2 includes an entrance 21 and an exit 22. The entrance 21 is communicated with the expending room 10, and the exit 22 includes a taper open 221 in the first valve room 13. The first valve room 13 includes a taper groove 23 communicated with the entrance 21. A plurality of groove 24 is arranged in the taper groove 23, a roll 25 is arranged in the taper groove 23, and a floating stopper 26 is arranged between the roll 25 and the exit 22. The floating stopper 26 has a protrusion 261 corresponding to the taper open 221 and a groove 262 corresponding to the roll 25. A first route 27 is defined between the inner surface of the first valve room 13 and the floating stopper 26 and communicated with the entrance 21 and the exit 22.

The double-lane valve 3 is arranged in the second valve room 14 between the canister 4 and the fuel control valve 2 (as shown in FIGS. 1-3). The double-lane valve 3 includes an entrance 31 communicated with the exit 22 of the fuel control valve 2 by passing through a pipe 17 and an exit 32 communicated with the fuel gas entrance 45 of the canister 4. A first valve 33 and a second valve 35 are arranged in the second valve room 14 between the entrance 31 and the exit 32. The first valve 33 withstands a spring 39 and the second valve 35 is arranged at the first valve 33.

Figures 6, 7:
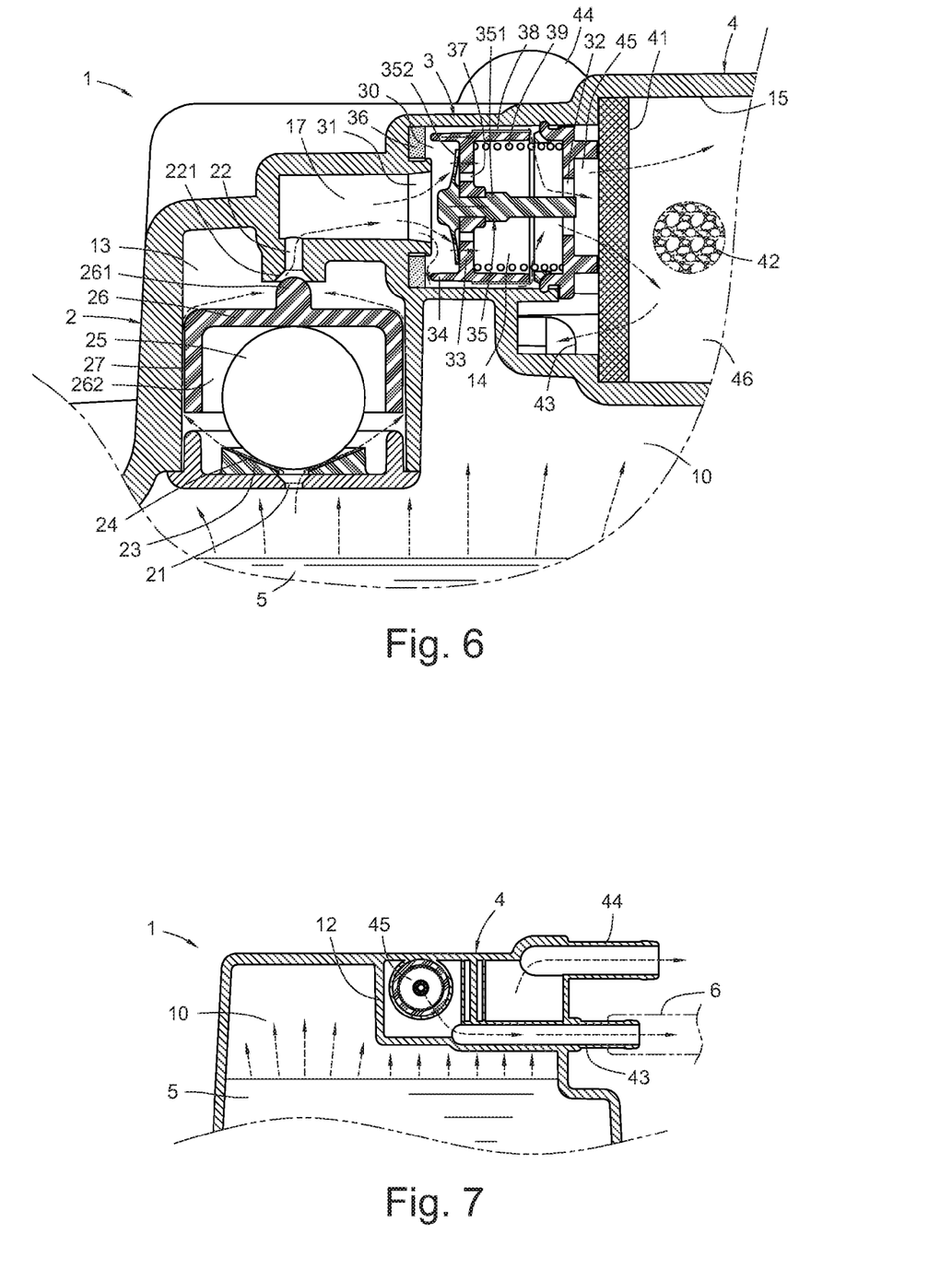
FIG. 6 is a schematic, cross-sectional view of FIG. 3, which is in an using condition.
FIG. 7 is a schematic, cross-sectional view of FIG. 4, which is in the using condition.

Preferably, an annular rib 34 is formed on the first valve 33 (as shown in FIG. 3), and an annular pad 36 is arranged around the entrance 31 of the second valve room 14. The annular rib 34 and the annular pad 36 forms an annular open 30 (as shown in FIG. 6), which can open or close the entrance 31. The spring 39 is arranged between the first valve 33 and the exit 32 to drive the annular rib 34 for closing the annular open 30 and forming a second route 38 communicated with the annular open 30 and the exit 32. The second valve 35 includes at least one air hole 37 arranged on the first valve 33, and an axis 351 assembled in the valve 33 having a discal film 352 for shielding the at least one air hole 37.

Figure 8:
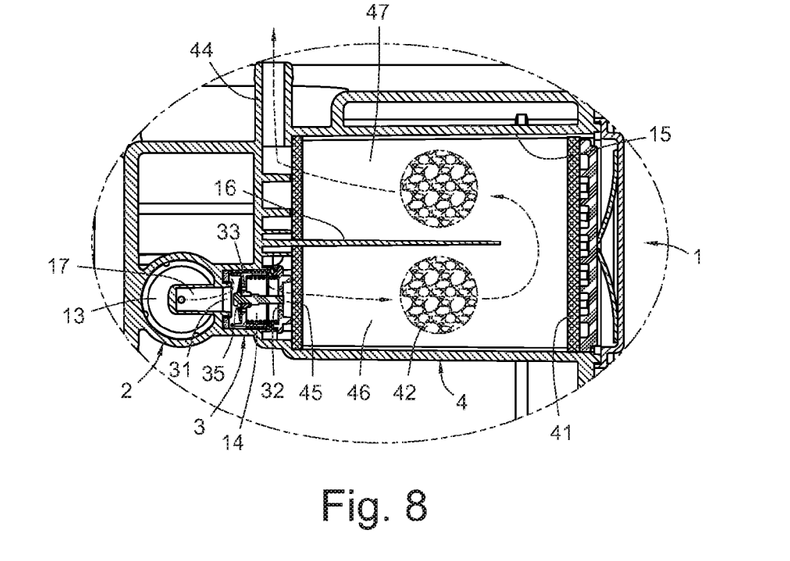
FIG. 8 is a schematic, cross-sectional view of FIG. 5, which is in an using condition.

The present invention can be performed by the above elements. When the fuel gas expanding press in the expanding room 10 is small, the first valve 33 of the double-lane valve 3 detects the expanding press less than the press produced by the spring 39, and the first valve 33 closes the annular open 30 to prevent the fuel gas entering into the canister 4 for preventing the fuel gas overflowing (as shown in FIG. 3). When the fuel tank 1 supplies naturally the fuel to the engine, the fuel gas in the expanding room 10 produces a large expanding press to make the fuel gas enter into the fuel control valve (as shown in FIG. 6) through the entrance 11, and enter the pipe 17 through the plurality of groove 24, the first route 27, the taper open 221 and the exit 22 to be guided into the entrance 31 of the double-lane valve 3. The first valve 33 detects the expanding press larger than the spring produced by the spring 39 to open the annular open 30 such that the fuel gas enter into the second route 38 through the annular open 30 and are guided into the first filtering room 46 through the exit 32 of the double-lane valve 3 and the fuel gas entrance 45 of the canister 4. The negative press suction produced at the entrance of the engine can pump forwardly one part of the fuel gas in the first filtering room 46 (as shown in FIG. 7), and the other fuel gas in the first filtering room 46 can be filtered by the activated carbon 42 of the first filtering room 46 and the second filtering room 47 (as shown in FIG. 8) to eliminate the deleterious matters of the fuel gas and be exhausted outsides through the second guiding pipe 44 to decrease gradually the expanding press of the expanding room 10.

Figure 9:
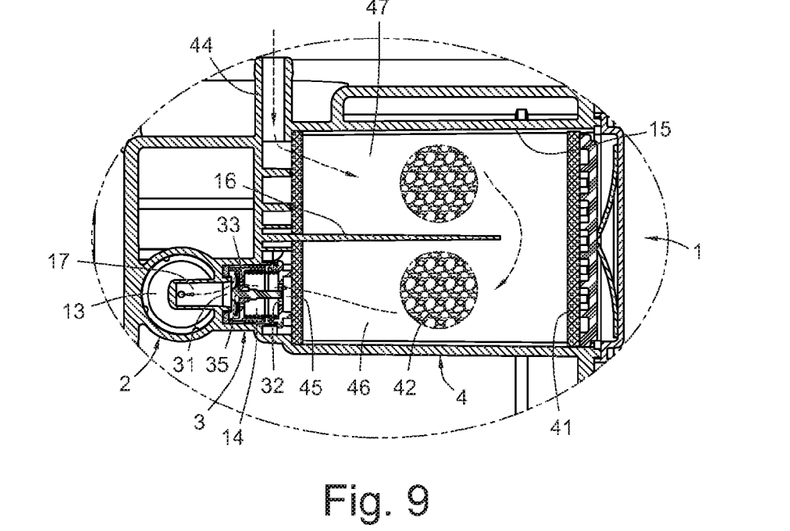
FIG. 9 is a schematic, cross-sectional view of FIG. 5, which is in another using condition.
Figure 10:
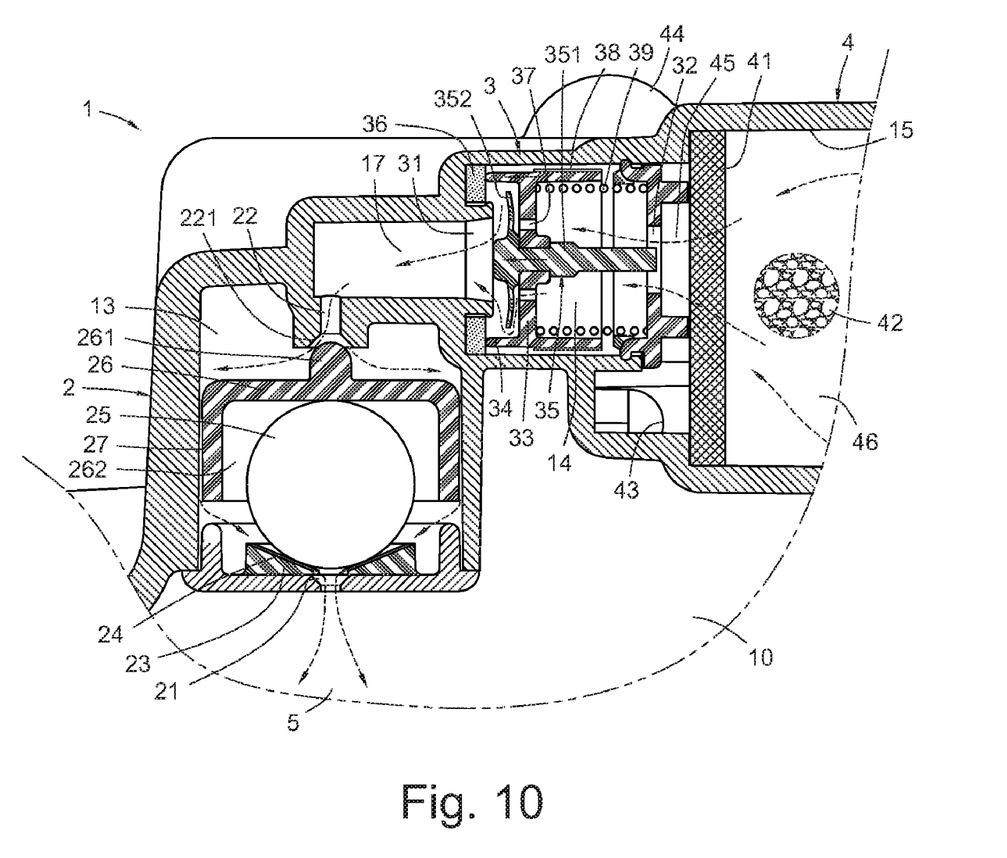
FIG. 10 is a schematic, cross-sectional view of FIG. 3, which is in another using condition.

When the fuel 5 is decreased to produce a vacuum press in the fuel tank 1, the discal film 352 detects the vacuum press larger than the air press to open the at least one air hole 37 (as shown in FIGS. 9 and 10). The air can enter into the canister 4 through the second guiding pipe 44, and enter into the double-lane valve 3 through the second filtering room 47, the first filtering room 46, the fuel gas entrance 45 and the exit 32 of the double-lane valve 3, then be guided into the fuel tank 1 through the pipe 17, the exit 22 of the fuel control valve 2, the taper open 221, the first route 27, the plurality of groove 24 and the entrance 21 of the fuel control valve 2 to decrease gradually the vacuum press of the fuel tank 1. Furthermore, when the discal film 352 detects the vacuum press less than the air press to shield the at least one air hole 37 for preventing the air entering into the fuel tank 1. Therefore, the fuel tank 1 can adjust freely the expanding press and the vacuum press therein.

Figure 11:
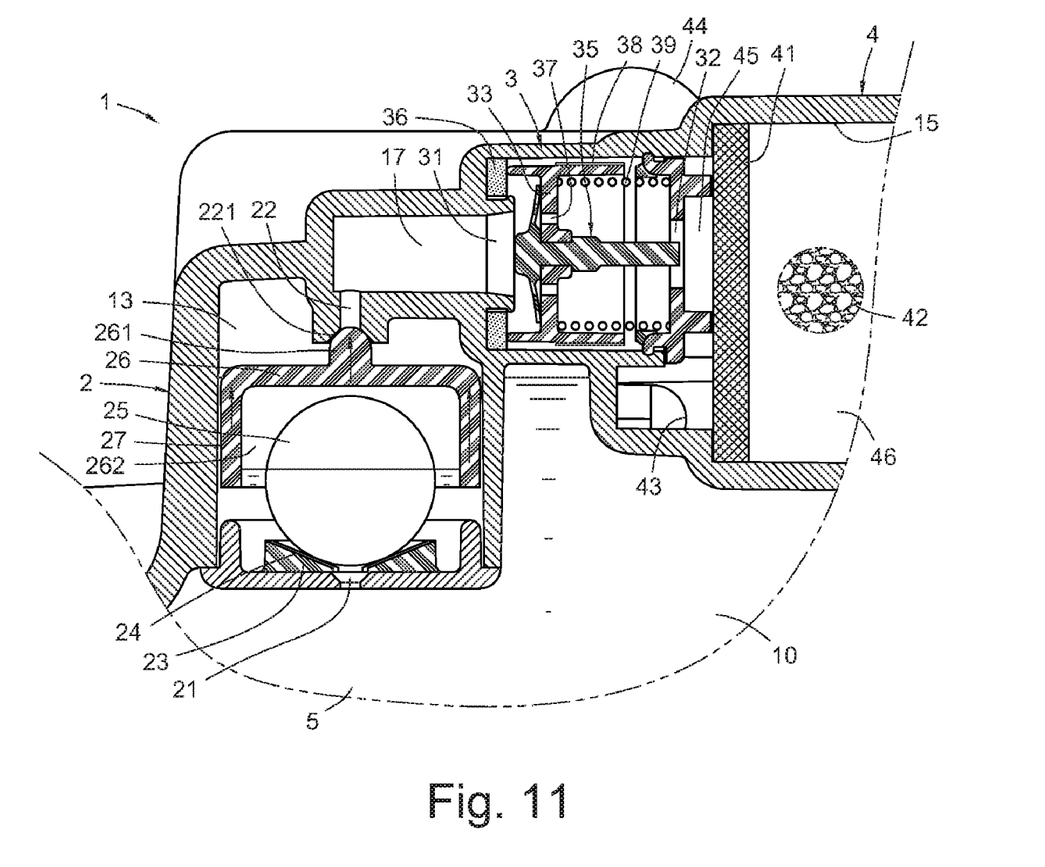
FIG. 11 is a schematic, cross-sectional view of FIG. 3, which is in other using condition.

Furthermore, when the fuel tank 1 is full of fuel 5, the fuel 5 overflows to the fuel control valve 2 through the entrance 21 (as shown in FIG. 11). The groove 262 of the floating stopper 26 has fuel gas therein, therefore, the floating stopper 26 is pushed by the fuel 5 to be raised such than the protrusion 261 is embedded into the taper open 221 to close the exit 22 of the fuel control valve 2 for preventing the fuel overflowing into the double-lane valve 3 and the canister 4 through the pipe 17 and preventing the fuel 5 overflowing.

Figure 12:
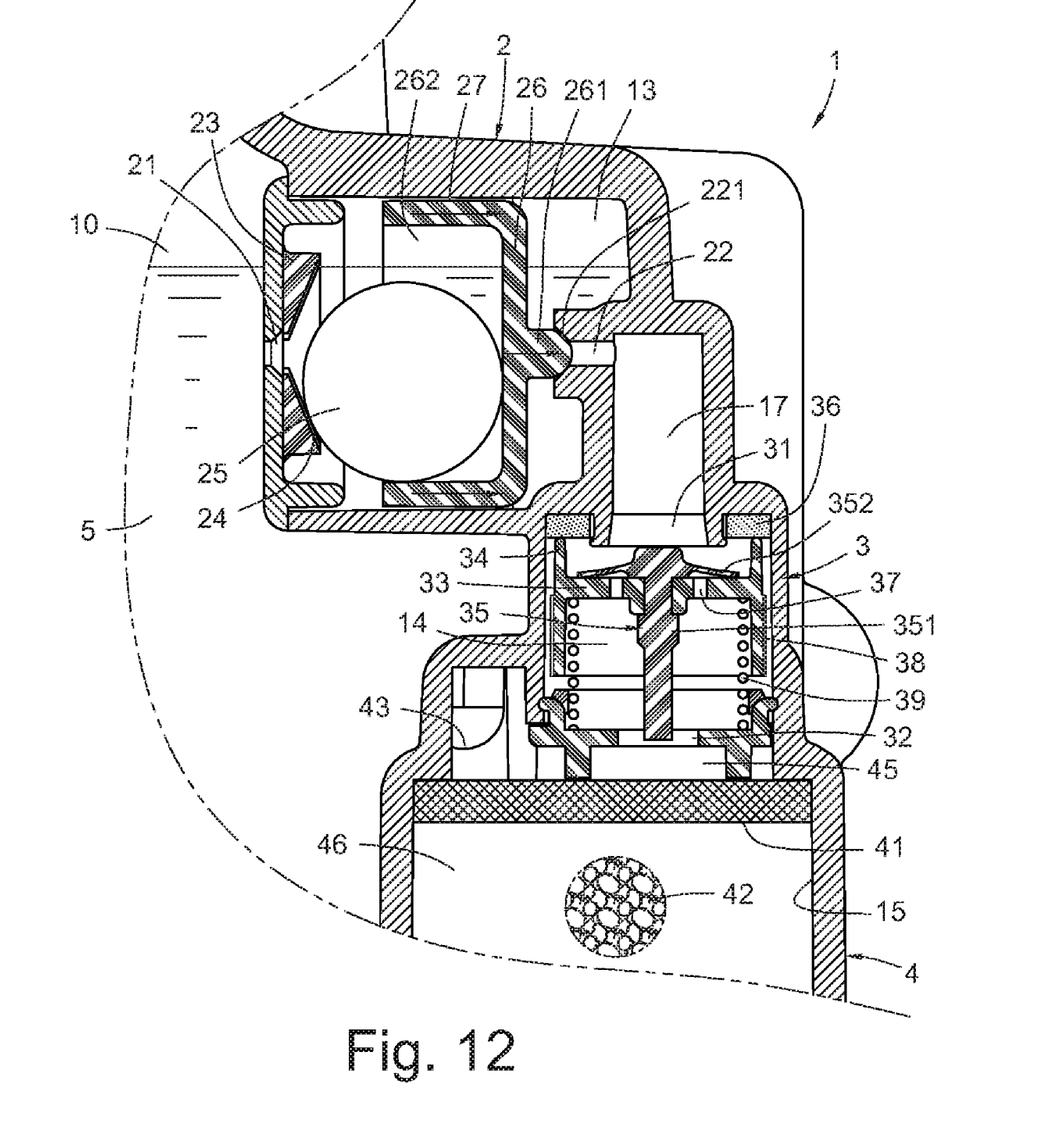
FIG. 12 is a schematic, part cross-sectional view of the present fuel tank, which is in an inclining condition.

When the vehicle inclines, the fuel tank 1 and the fuel control valve 2, the double-lane valve 3 and the canister 4 of the expanding room 10 will incline to be in a vertical condition (as shown in FIG. 12). The roll 25 of the fuel control valve 2 will roll forwards from the taper groove 23 to push the groove 262 of the floating stopper 26 such that the protrusion 261 of the floating stopper 26 embeds into the taper open 221 and the exit 22 of the fuel control valve 2 closes for preventing the fuel overflowing through the double-lane valve 3 and the canister 4. Therefore, the fuel tank 1 can prevent the fuel therein overflowing and increase the use-life of the canister 4. Furthermore, since there are no soft pipes used to connect the fuel control valve 2, the double-lane valve and the canister 4, the resistance of the fuel flowing is decreased.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fuel tank, comprising:
   an expanding room by using a clapboard arranged in the top of the fuel tank to space out fuel gas from fuel;
   a canister arranged in the expanding room and having two guiding pipes communicated respectively with an entrance of an engine and the environment;
   a fuel control valve arranged in the expanding room and adjacent to the canister, the fuel control valve being communicated with the expanding room; and
   a double-lane valve arranged between the canister and the fuel control valve, the double-lane valve having an entrance communicated with the fuel control valve, an exit communicated with the canister, a first valve and a second valve arranged between the entrance and the exit, the second valve withstanding a spring and arranged on the first valve,
   wherein the first valve opens to recycle the volatized fuel gas of the expanding room into the entrance of the engine through the fuel control valve when the first valve detecting an expanding press produced by volatilized fuel gas larger than a press produced by the spring and closes to prevent the fuel gas recycling when the expanding press being less than the press produced by the spring, the second valve opening to compensate air into the fuel tank through the canister when the second valve detecting a vacuum press of the fuel tank larger than the air press and closes to prevent the air entering into the fuel tank when the second valve detecting the vacuum press of the fuel tank less than the air press.

2. A fuel tank as claimed in claim 1, wherein the fuel control valve comprises:
   a first valve room having an exit communicated with the entrance of the double-lane valve and an entrance communicated with the expanding room;
   a taper groove arranged on the entrance of the first valve room, the taper groove communicated with the entrance of the first valve room and having a plurality of groove formed therein;
   a roll arranged in the taper groove; and
   a floating stopper arranged between the roll and the exit of the first valve, the floating stopper having a protrusion corresponding to the exit of the first valve and a groove corresponding to the roll, a first route being defined between the floating stopper and the inner surface of the first valve room and communicated with the entrance and the exit of the first valve.

3. The fuel tank as claimed in claim 1, wherein the double-lane valve comprises:
   a second valve room formed between the entrance and the exit, the first valve being arranged slipably in the second valve room, a second route being defined between the first valve and the inner surface of the second valve room and being communicated with the exit;
   a annular rib arranged on the first valve, and an annular open being defined between the entrance and the annular rib and being communicated with the second route; and
   at least one air hole arranged on the first valve, the second valve shielding on the at least one air.

4. The fuel tank as claimed in claim 3, wherein the second valve is a discal film.

5. The fuel tank as claimed in claim 1, wherein the second valve is a discal film.

* * * * *